US006074434A

United States Patent [19]
Cole et al.

[11] Patent Number: 6,074,434
[45] Date of Patent: *Jun. 13, 2000

[54] SELECTION OF CODE UPDATES, DATA UPDATES OR NEW DATA FOR CLIENT

[75] Inventors: Gary Lee Cole, Endicott; Scott Phillip Engleman, Vestal; Steven Michael Pritko, Endicott, all of N.Y.

[73] Assignee: International Business Machines Corporation, Armonk, N.Y.

[ * ] Notice: This patent is subject to a terminal disclaimer.

[21] Appl. No.: 08/814,771

[22] Filed: Mar. 7, 1997

Related U.S. Application Data

[63] Continuation-in-part of application No. 08/659,841, Jun. 7, 1996, Pat. No. 5,752,042.

[51] Int. Cl.[7] .............................. G06F 9/445; G06F 9/45
[52] U.S. Cl. .................................... 717/11; 717/3
[58] Field of Search .................................. 395/712, 703; 707/3, 10, 201, 203; 709/221, 305

[56] References Cited

U.S. PATENT DOCUMENTS

| | | | |
|---|---|---|---|
| 4,558,413 | 12/1985 | Schmidt et al. | 707/203 |
| 4,714,995 | 12/1987 | Materna et al. | 207/201 |
| 5,133,075 | 7/1992 | Risch | 707/201 |
| 5,339,430 | 8/1994 | Lundin et al. | 709/305 |
| 5,452,448 | 9/1995 | Sakuraba et al. | 707/201 |
| 5,473,772 | 12/1995 | Halliwell et al. | 395/712 |
| 5,491,820 | 2/1996 | Belove et al. | 707/3 |
| 5,495,610 | 2/1996 | Shing et al. | 709/221 |
| 5,553,282 | 9/1996 | Parrish et al. | 707/10 |
| 5,581,764 | 12/1996 | Fitzgerald et al. | 395/703 |
| 5,619,716 | 4/1997 | Nonaka et al. | 395/712 |

FOREIGN PATENT DOCUMENTS

| | | | |
|---|---|---|---|
| 20280 | 1/1993 | Japan | G06F 15/16 |
| 129407 | 5/1995 | Japan | G06F 9/445 |
| 175641 | 7/1995 | Japan | G06F 9/06 |
| 225724 | 8/1995 | Japan | G06F 13/00 |
| 7295830 | 11/1995 | Japan | G06F 9/445 |

OTHER PUBLICATIONS

Lyon, Norton Antivirus 2.0 for Windows NT, PC/Computing, v10, n2, p. 228, Feb. 1997.

IBM upgrades OS/2 Warp 4.0 via Web (new Internet–based software delivery system), PC Week, v14, n18, p43, May 1997.

Tabibian, When free is not enough (NetSync's WebPatch software–updating service, Windows Sources, v5, n1, p153, Jan. 1997.

Norr, Instant update reborn: ON expands workgroup app., MacWEEK, v9, n38, p6, Feb. 1997.

(List continued on next page.)

*Primary Examiner*—Tariq R. Hafiz
*Assistant Examiner*—Hoang-Vu Antony Nguyen-Ba
*Attorney, Agent, or Firm*—Arthur J. Samodovitz

[57] ABSTRACT

A server computer selects code updates to download to a client computer as follows. The server computer identifies code updates which are consistent with basic system characteristics of the client computer. Then, the server computer sends to the client computer one or more "recognizer" programs which execute in the client computer to determine whether the client computer has a version other than a current version of the consistent code updates. The client sends the results to the server computer which generates a list of those code updates which are consistent with the basic system characteristics, and represent programs that exist on the client computer for which an update would be appropriate. The server computer also identifies new data which is consistent with attributes of a user of the client computer. Then, the server computer sends to the client computer one or more recognizer programs which execute in the client computer to determine whether the client computer already has the consistent new data. The client sends the results to the server computer which generates a list of that new data which is consistent with the user attributes and not currently resident in the client computer.

20 Claims, 12 Drawing Sheets

OTHER PUBLICATIONS

Product Briefing: Cybermedia Oil Change Software: How it works, PR Newswire, May 1996.

Oil Change V2.5. Product Description [online]. McAfee Store, 1999 [retrieved on Jun. 30, 1996].

McAfee Activator Plug–in. Download Site [online]. McAfee Store, 1999 [retrieved on Jun. 30, 1999].

IBM Technical Disclosure Bulletin vol. 38, No. 12, Dec. 1995, p. 479, "Disk Drive With Embedded Hyper–Text Markup Language Server".

Copies of "Surfin Service" transparency foils.

SELECTION OF CODE UPDATES, DATA UPDATES OR NEW DATA FOR CLIENT

This is a continuation-in-part of U.S. patent application Ser. No. 08/659,841 entitled "Server Computer For Selecting Program Updates For A Client Computer Based On Results Of Recognizer Program(s) Furnished To The Client Computer" filed Jun. 7, 1996, now U.S. Pat. No. 5,752,042.

BACKGROUND OF THE INVENTION

The invention relates generally to computer networks and deals more particularly with a technique for selecting code updates, data updates or new data stored in a server for installation in a client computer.

A computer includes hardware and programs such as an operating system and applications. Often times, after a program is installed, there are subsequent code "fixes", new versions and revisions (collectively called "code updates"). The updates may comprise a replacement of one or more bytes of the existing program, a single file of the program or the entire program. Typically each code update also includes a short routine to actually install the updated code in the client. The installation routine typically replaces selected bytes or files in the existing program with new bytes or files from the update.

A user of the client computer may also need new data or data updates such as updated customer lists, product catalogs, directories, etc. It may also be desirable to send unsolicited advertisements or product literature to the user.

The "Internet" is well known today and comprises client computers connected via modems and communication lines to one or more servers and respective data bases. Servers provide a wide variety of services to the clients such as routing of electronic mail and information, news service, management of web pages and web sites, management of code updates, etc. The data bases include actual data, code updates and meta data which describes the actual data and code updates.

There are various known techniques for a server to provide a client with a code update or a user with new data. In one technique, clients register with the server for updates to a particular program and users register with the server for updates or new data. Whenever the server obtains a new update for that program or new data of the specified type, the server automatically sends the code update or new data of the specified type to every client/user on the list. Unfortunately, some users may not wish to obtain a particular update or particular new data of the specified type because of cost, download time or other reason. Alternately, a user can periodically request all code updates or new data of specified types and the server will respond accordingly. Unfortunately again, the user may not need every code update or data of the specified type but nevertheless, endures the cost and download time. In general, because of the large number and complexity of software applications on a user's system, and the large number and complexity of the corresponding updates for that system, it is very difficult for users to know what updates are appropriate for them. Likewise, there is so much new data generated every day that it is difficult to know what new data is appropriate for particular users.

A general object of the present invention is to provide a method and system for selecting code updates and new data for a user.

SUMMARY OF THE INVENTION

One feature of the present invention resides in a server computer for selecting code updates to download to a client computer. The server computer identifies code updates which are consistent with basic system characteristics of the client computer. Then, the server computer sends to the client computer one or more "recognizer" programs which execute in the client computer to determine whether the client computer has a version other than a current version of the consistent code updates. The client sends the results to the server computer which generates a list of code updates which are consistent with the basic system characteristics and represent programs that exist on the client computer for which an update would be appropriate. The server computer may send the list or information about the list to the client computer. A user at the client computer may select from the list and send the selections to the server computer. In response, the server computer sends addresses of the selected code updates to the client computer and the client computer downloads the selected code updates from a server computer.

According to another feature of the present invention, the server sends an address of one of the "recognizer" programs for each of the code updates that is consistent with the basic system characteristics of the client computer.

According to another feature of the present invention, the server computer also selects new data to download to a client computer as follows. The server computer identifies new data which is consistent with attributes of a user of the client computer. Then, the server computer sends to the client computer one or more recognizer programs which execute in the client computer to determine whether the client computer already has the consistent new data. The client sends the results to the server computer which generates a list of those code updates which are consistent with the user's attributes but not currently resident in the client computer. The server computer may send the list or information about the list to the client computer, and the user may select from the list and send the selections to the server computer. In response, the server computer sends addresses of the selected new data to the client computer and the client computer downloads the selected new data from a server computer.

According to another feature of the present invention, the server sends an address of one of the recognizer programs for each of the new data that is consistent with the user's attributes.

DETAILED DESCRIPTION OF THE PREFERRED EMBODIMENTS

Figure 1:
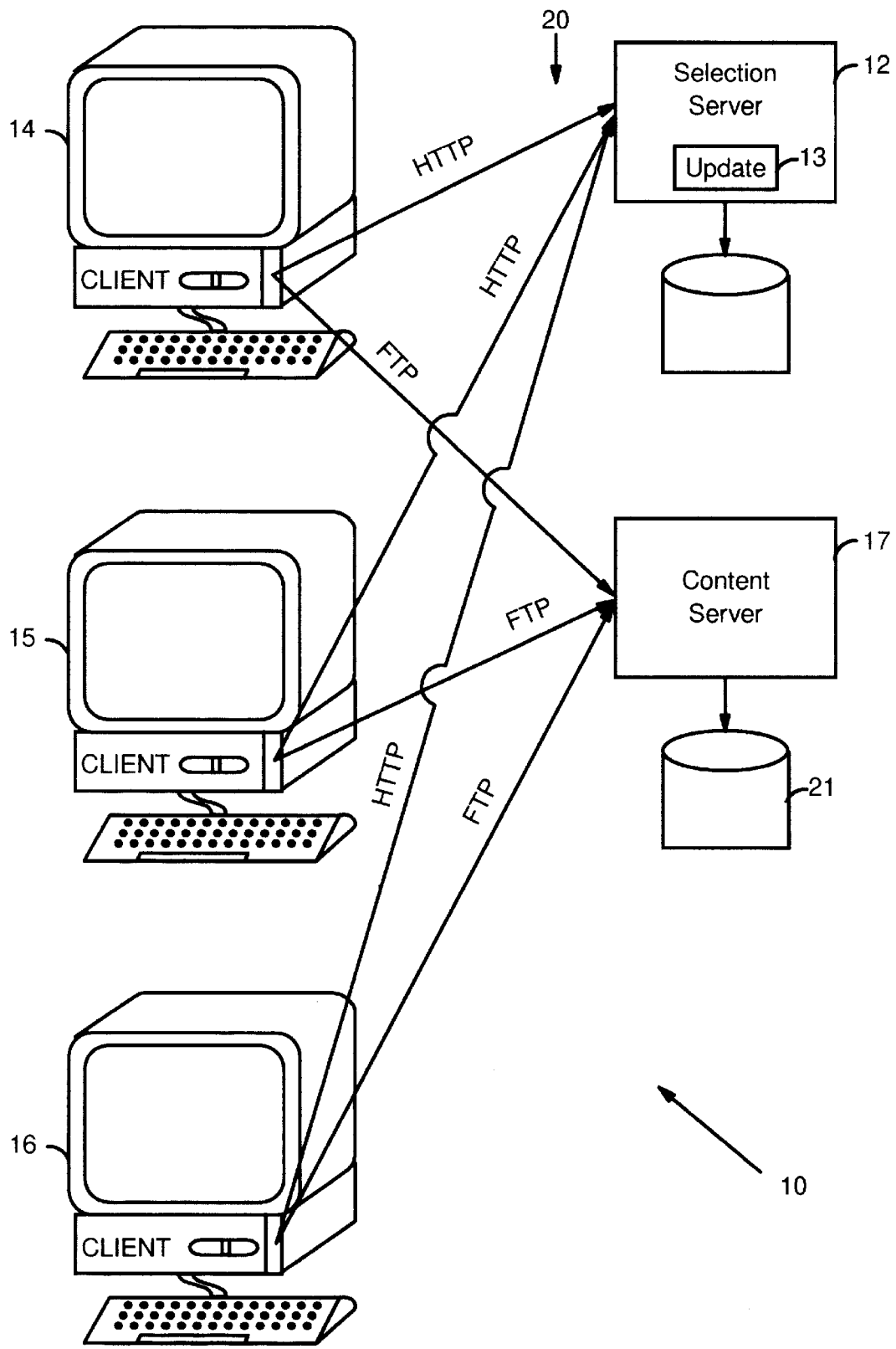
FIG. 1 illustrates a computer network which incorporates the present invention.

Referring now to the drawings in detail wherein like reference numbers indicate like elements throughout, FIG. 1 illustrates a computer network generally designated 10 according to the present invention. Network 10 comprises a selection server 12 with a data base 13, a content server 17, clients 14–16 and an Internet 20 to interconnect the servers and clients. By way of example, the selection server 12 comprises a computer workstation, associated programming and a modem, the content server 17 comprises a computer workstation, associated programming and a modem and each of the clients 14–16 comprises a personal computer, associated programming and a modem. The Internet comprises a communication medium such as telephone wires between the clients 14–16, the selection server 12 and the content server 17 and programming to manage the communications. Communications between the clients and the selection server 12 utilize hypertext transport protocol (HTTP) and communications between the clients and the content server 17 utilize file transport protocol (FTP). Although not shown, there are many other servers for the Internet. Selection server 12 is dedicated to automating selection of code updates, the content server 17 includes the actual code updates (stored on disk 21), and data base 13 includes meta data for the code updates and FTP addressing information to locate the code updates in content server 17. The meta data provides descriptive information about the respective code updates such as Bios level, pre-load level, motherboard ID, etc. The FTP addressing information indicates the address or identification of the content server which stores the respective code update (content server 17 in the illustrated example), a user ID and password to log-on to the content server, a name of the code update, a list of files which comprise the code update and the size, checksum and directory of each file.

The process for storing the updates in the content server 17 and the meta data in the selection server 12 are not critical to the present invention. However, according to one process, a person writes the code update and meta data and loads them into the content server 17, either via the Internet or by manual loading. The code updates remain stored in the content server, but the meta data is written to the selection server, either via the Internet or by manual loading.

Figure 2:
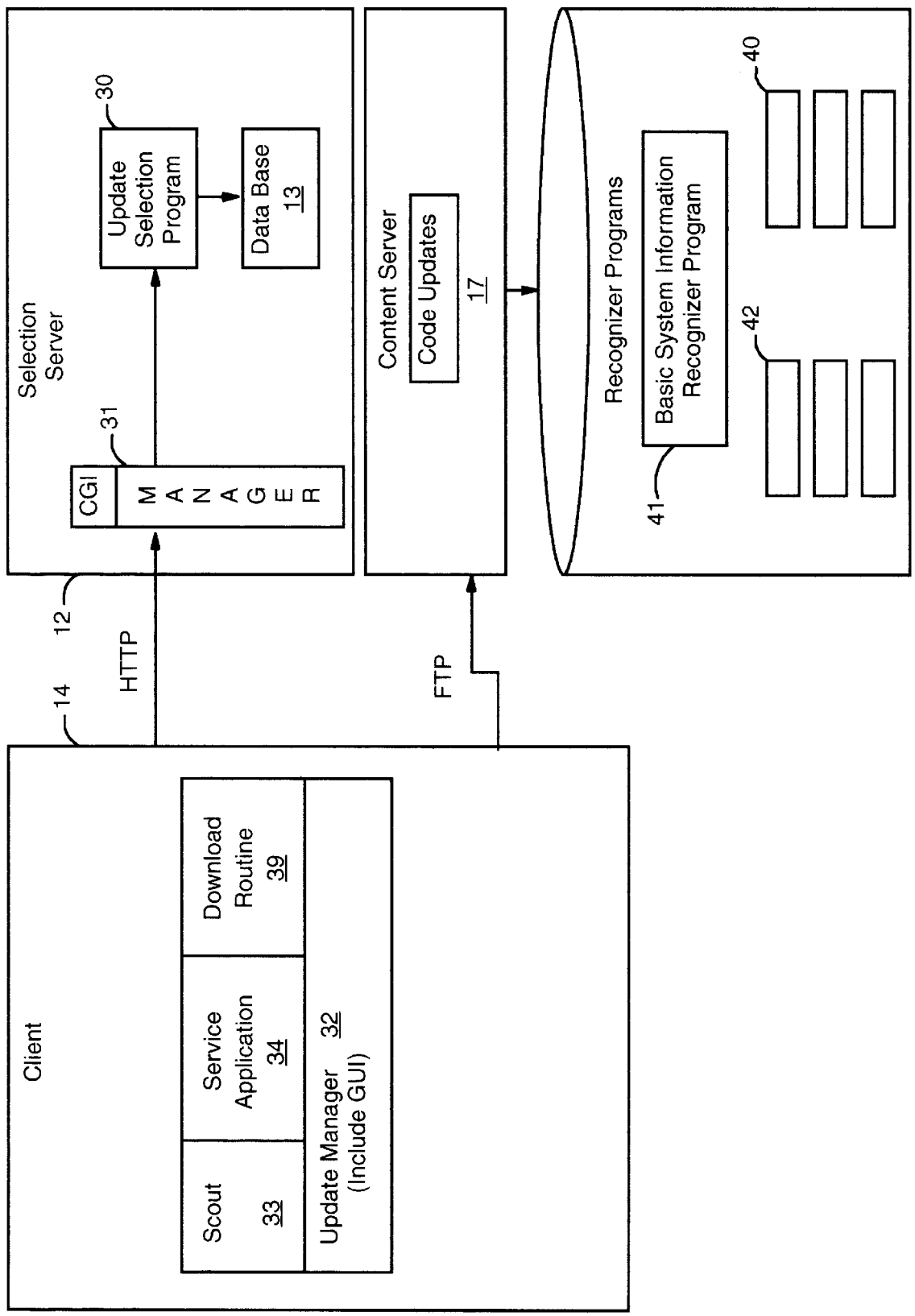
FIG. 2 is a block diagram of a selection server, content server and a client in the network of FIG. 1, which server and client are programmed according to the present invention.
Figure 3A:
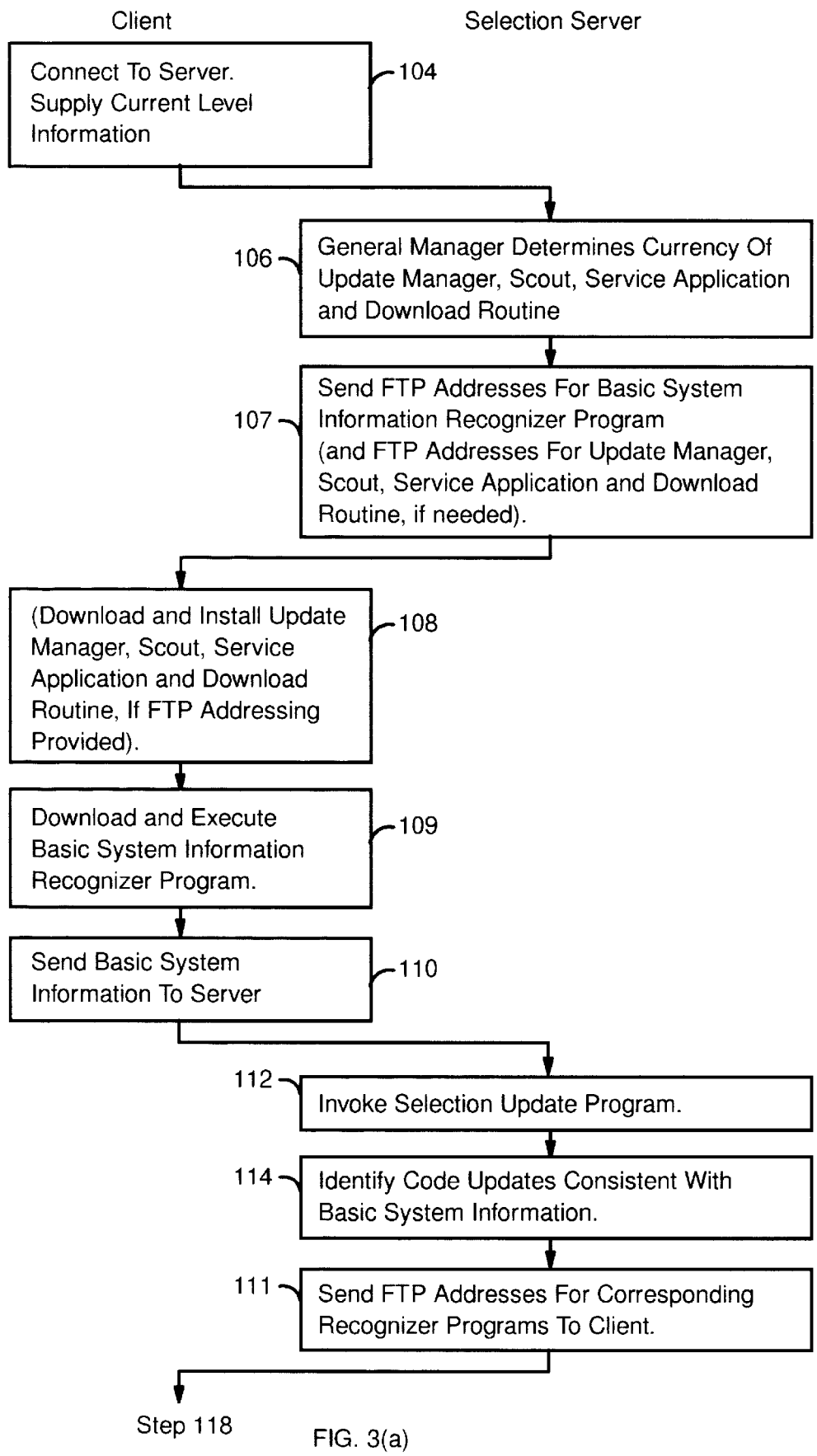
FIGS. 3(a,b) form a flow chart illustrating operation of the client and server of FIG. 2.
Figure 3B:
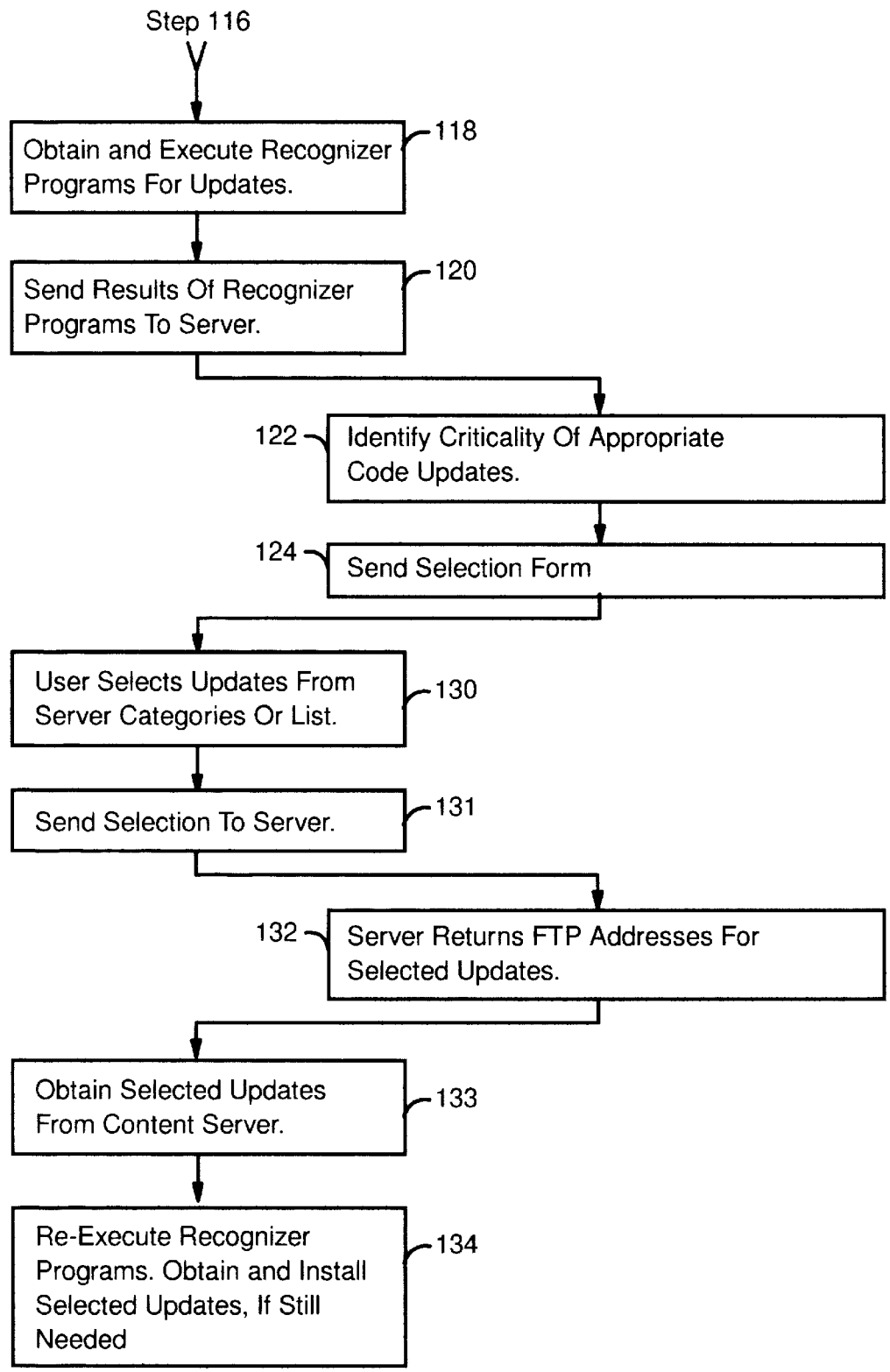

As illustrated in FIG. 2, the selection server 12 is an http server with an associated "CGI" program 31 and includes an update selection program 30. The client 14 includes an update manager program 32 (including a GUI), a scout routine 33, a service application routine 34 and a download routine 39. The functions of the server and client programming and a typical client/server session for selecting and downloading updates are illustrated in FIGS. 3(a,b). A user at client computer 14 selects an icon to invoke update manager 32. In response, the update manager contacts the general manager 31 in server 12 to begin a session and supplies the current level of update manager 32, scout 33, service application 34 and download routine 39 within client 14 (step 104). In response, the general manager 31 determines if the client's update manager 32, scout 33, service application 12 and download routine 39 are the latest version (step 106). This determination is performed by comparing the client level information supplied by the client 14 to the data in selection server 12 for the latest version of the client's update manager 32, scout 33, service application 34 and download routine 39 stored in the content server 17.

If the client's update manager, scout, service application and download routine are not the latest version, the server sends the FTP addressing information to the client to allow the client to retrieve the latest versions from a content server. Along with the FTP addressing for the client update manager, scout, service application and download routine, the server sends FTP addressing information to the client for a basic system information recognizer program 41 stored in content server 17 (step 107). Next, the client downloads and installs the latest version of the client update manager, scout, service application and download routine from the content server if the FTP addressing was provided (step 108).

The furnishing of the FTP addressing information for the basic system information recognizer program begins the selection process according to the present invention. The client next downloads the basic system information recognizer program 41 from the content server and executes it (step 109). The basic system information recognizer program then obtains basic system information using scout APIs, about client 14 (step 109). The basic system information comprises system model, pre-load software level, BIOS level, and information that is not likely to change often such as type of operating system. For example, the basic system information of client 14 is BIOS level 123, BIOS date Jan. 1, 1996 and mother board ID XYZ. The update manager routine 32 then sends the basic system information, obtained by the recognizer program, to the selection server 12 (step 110).

This initiates the selection update program 30 (step 112). The selection update program 30 within server 12 then determines which code updates are consistent with the basic system information of the client and which code updates are inconsistent thereby eliminating the vast majority of the code updates stored in content server 17 (and other content servers, if any) from further consideration (step 114). In the illustrated embodiment, this determination is made by correlating the meta data in data base 13 to the basic system information obtained from client 14. Matches between the meta data and the basic system information indicate that the corresponding code updates are potentially appropriate for client 14. (In practice, the meta data can be arranged in a relational data base to facilitate the correlation). The first two columns of the following table list code updates available in content server 17 and the meta data for these code updates. The first two columns of this table are used for the initial correlation of the basic system information obtained from client 14 to the meta data (column 2) stored in selection server 12.

| Code Updates | Basic System Information/ Meta Data |
|---|---|
| Device Driver ABCDE.DRV | BIOS Level 123 BIOS date 1/1/96 |

-continued

|  | Mother Board ID XYZ |
|---|---|
| Netcomber 2.0 | BIOS Level 123 BIOS date 1/1/96 Mother Board ID XYZ |
| Device Driver FGHIJ.DRV | BIOS Level 456 BIOS date 2/1/96 Mother Board ID XYZ |

In this example, the BIOS level 123, BIOS date Jan. 1, 1996 and mother board ID XYZ basic system information obtained from client 14 is consistent with a device driver file named ABCDE.DRV. and Netcomber (trademark of International Business Machines Corporation) version 2.0. However, device driver file named FGHIJ.DRV requires BIOS level 456 so is inconsistent with the basic system information obtained from client 14 and is eliminated from further consideration.

For each code update, such as device driver file named ABCDE.DRV. and Netcomber program version 2.0, which is consistent with the basic system information of client 14, the selection update program 30 sends to the client 14 the FTP addressing information of a corresponding recognizer program, such as recognizer programs 40 and 42, respectively (step 111). However, the FTP addressing information is not provided (and no recognizer program is fetched) to client 14 for the device driver file named FGHIJ.DRV, because file FGHIJ.DRV is not consistent with the basic system information of client 14. From the FTP addressing information, the client 14 downloads the actual recognizer programs from the content server 17 (step 118).

Each recognizer program is executable and small, typically 2,000–3,000 bytes. Consequently, each recognizer program can be downloaded from content server 17 to the client 14 in seconds (whereas the corresponding code update is much larger and may take hours to download).

It should be noted that based on the basic system information alone, the selection update program 30 within server 12 is not sure which of the code updates that are consistent with the basic system information are actually needed by the client; for example, the client may already have the latest version.

Next, the client 14 executes each recognizer program 40 and 42 with assistance from the scout 33 (step 118). The scout 33 assists the recognizer programs by providing subroutines callable by the recognizer programs. For files required by the recognizer programs, these callable subroutines can locate the files, determine the version of the files, determine the length of the file, identify a directory which lists the files, obtain time stamps for the files, obtain data from inside the files and obtain data from a program registry. This further reduces the requisite length of each recognizer program and therefore shortens the download time. When executed, each recognizer program further investigates the hardware, software and other components of the client 14 for information to determine whether the corresponding code update is appropriate for the client 14. For example, this investigation reveals if the client 14 already has these code updates as follows. A recognizer program could also determine if the corresponding code update is consistent with aspects of the client other than the basic system information, such as other programs within the client.

Recognizer program 40 determines from the scout routine 33 in client 14 if the size of file ABCDE.DRV. stored by the client 14 is the same as the size of file ABCDE.DRV. stored in the data base 13. If so, then client 14 has the latest update. If not, then client 14 likely has an old version which could be updated.

Figure 4:
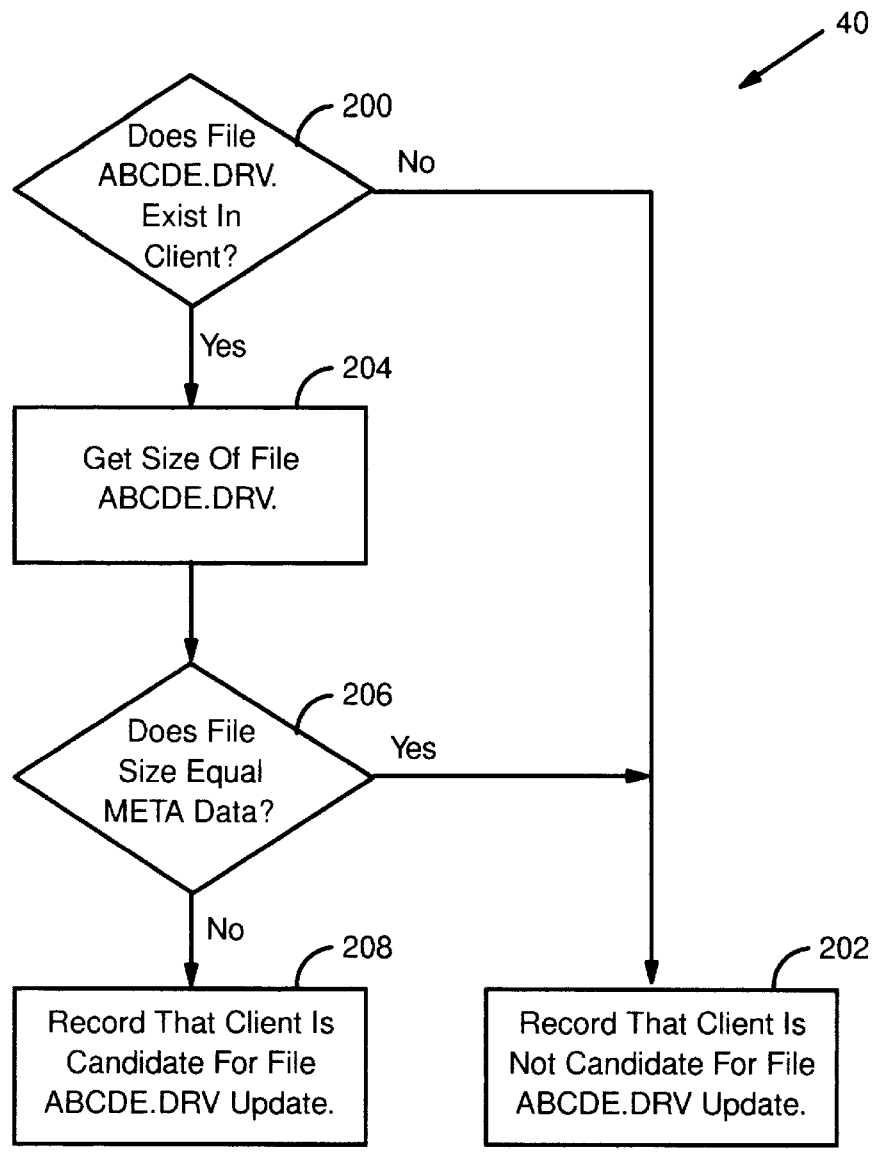
FIG. 4 is a flow chart illustrating a program sent from the server to the client of FIG. 2 to determine needs of the client for a particular code update.

FIG. 4 illustrates recognizer program 40 in more detail. In step 200, recognizer program 40 calls scout 33 to scan client 14's hard disk for file ABCDE.DRV to determine if file ABCDE.DRV exists in client 14. If not, the recognizer program provides an indication that file ABCDE.DRV is not appropriate for client 14 (step 202). However, if file ABCDE.DRV exists in client 14, then recognizer program 40 calls scout 33 to retrieve the size of file ABCDE.DRV in client 14 (step 204), and then compares the file size to the size of the latest version stored in the content server (decision 206). (The recognizer program includes an indication of the size of the corresponding update in the content server.) If the two sizes are the same, then there is no need to download file ABCDE.DRV from the content server 17; client 14 already has the latest version. However, if the two sizes are not the same, then recognizer program 40 makes a record that the file ABCDE.DRV stored in the content server 17 is appropriate for client 14 (step 208).

Recognizer program 42 compares a version number of the Netcomber program in the client to the version number of the Netcomber program of the code update, and if the version number of the Netcomber program installed in client 14 is less, then the client likely has an old version.

Figure 5:
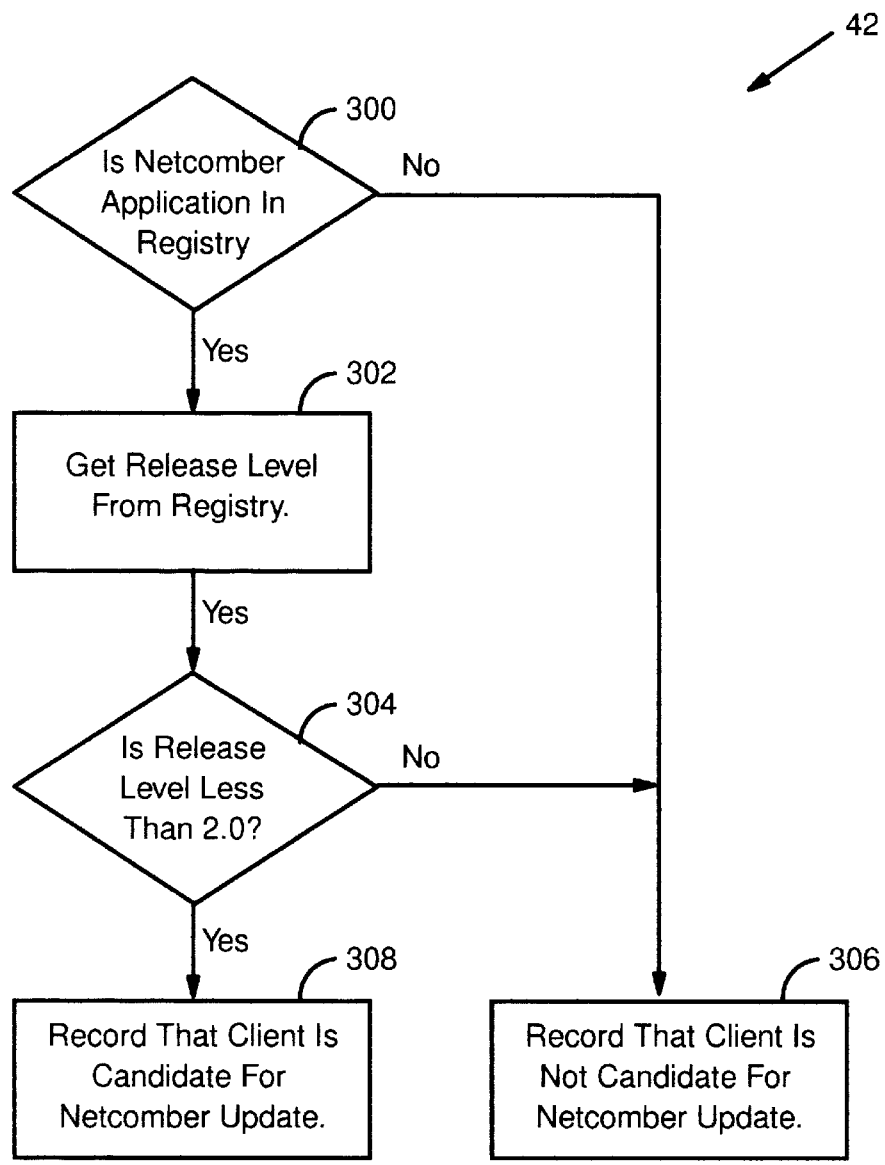
FIG. 5 is another flow chart illustrating a program sent from the server to the client of FIG. 2 to determine needs of the client for another particular code update.

FIG. 5 illustrates recognizer program 42 in more detail. In step 300, recognizer program 42 calls scout 33 to read a data base in client 14 to determine if the Netcomber program exists in client 14. If it does, recognizer program 42 calls scout 33 to obtain the version number of the Netcomber program from the data base (step 302). If the version number stored in the data base is equal to or greater than the version number in the recognizer program, then client 14 does not need the version stored in the content server 17 (decision 304 and step 306). However, if the version number stored in the data base is less than the version number in the recognizer program, then the recognizer program records that client 14 needs the copy of the Netcomber program stored in the content server 17 (decision 304 and step 308).

The results of the recognizer programs include yes/no answers whether each respective code update is appropriate for the client, i.e. not currently resident in client 14 (and consistent with the client basic system information as determined previously in step 114). The recognizer programs can also assign a "critical" level to each code update based on the need of the client for the update. For example, if another program in the client needs this code update to function, then this code update would be assigned a high level of criticality. After the recognizer programs are executed in client 14, client 14 sends to selection server 12 a list of the code updates which are appropriate for the client (step 120).

Based on the information gathered by the recognizer programs, the update selection program determines the level of criticality of the respective code updates and builds a selection form for display at the client (step 122). The selection form comprises a list of the code updates that are consistent with the basic system information and appropriate for the client 14, and a display of the following three selection choices (step 124):

1. minimum number of code updates—code updates which are necessary for the client to ensure compatibility between programs within the client and fix a significant "bug" in a program within the client, and those other updates that the author of the code update deemed critical such as replacement of unsupported programs.

2. maximum number of code updates—all code updates which are consistent with the basic system information and appropriate for the client.
3. client selection of specific code updates—user selects particular code updates from the list of all code updates which are consistent with the basic system information and appropriate for the client.

Next, the client makes a selection, either selection of the first or second categories or an itemized list of code updates pursuant to the third category (step 130), and sends the selection to the server (step 131). In response, the server 12 sends to the client 14 the FTP addressing information for the selected code updates (step 132). Using this FTP addressing information, the download routine 39 of the client downloads the code updates from the content server 17 (step 133). (In the preferred embodiment of the present invention, the FTP addressing information for all code updates represented in the selection form are passed with the selection form to the client 14 in step 124.)

As the code updates are being downloaded, the download routine also records status information (such as the FTP addresses) of the code updates in case of interruption to the communication line. If there is such an interruption, the downloading can continue later where it left off. Since the interruption could be lengthy and the system characteristics could have been altered, immediately before the selected code updates are actually installed, the update manager 32 invokes the corresponding recognizer programs again to ensure that the code updates are still required; it is possible that changes could have occurred to the client since the recognizer programs were previously executed. If the code updates are still appropriate, the service application routine of client 14 installs the code updates in the client 14 as follows (step 134). For every code update file whose stale version is not currently in use by client 14, the service application routine replaces the stale file with the updated file. The update manager also lists each code update file whose stale version is currently in use. Then, the client is requested to re-boot, and the operating system installs the listed code updates during the re-boot. For all, code updates selected by the user which represents one or more bytes of a file, the service application routine replaces just the one or more bytes of the file. For such files which are not currently in use, this occurs without requesting the user to re-boot. For such files which are currently in use, the user is requested to re-boot, and the operating system installs the one or more bytes during the re-boot.

Figure 6:
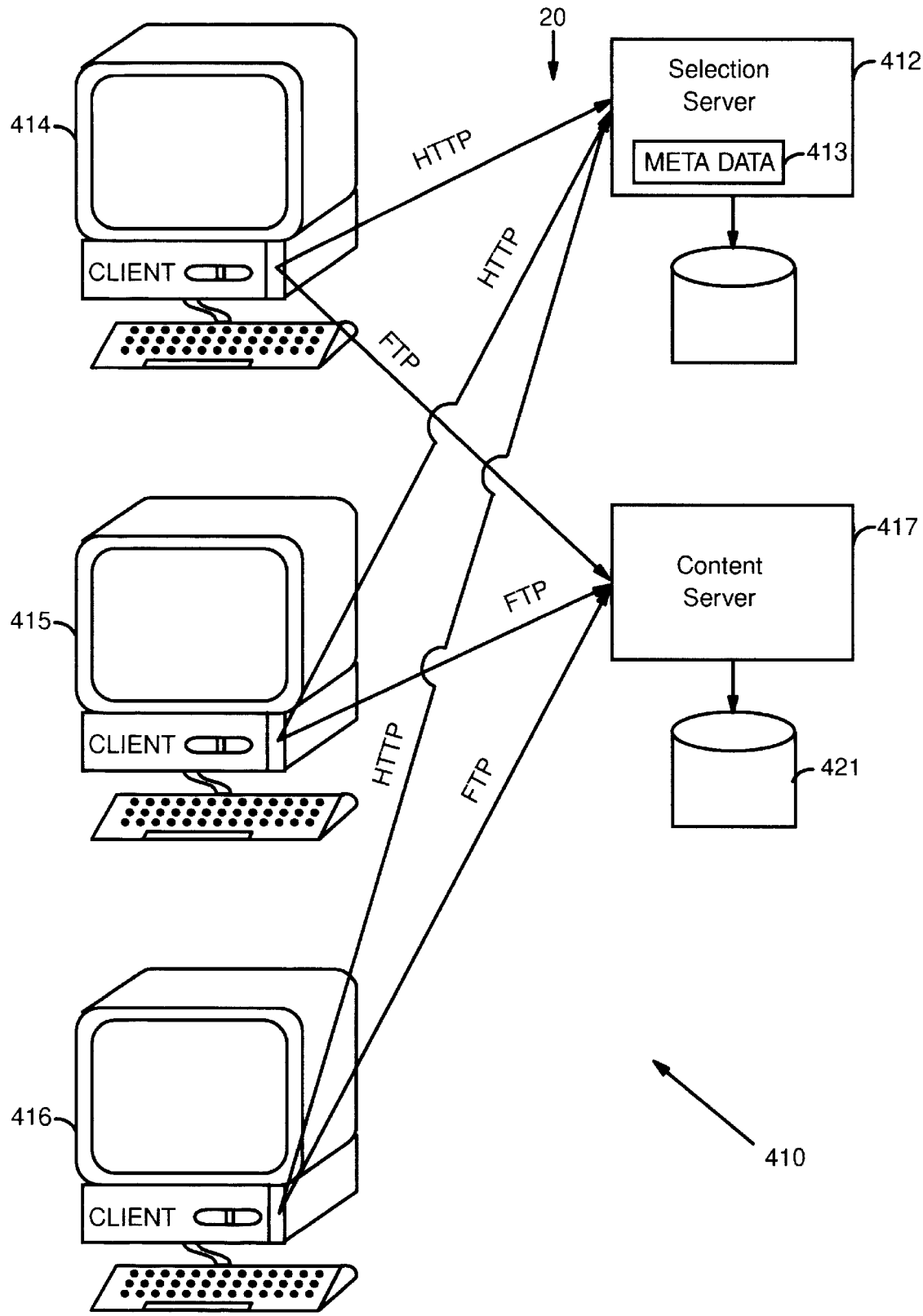
FIG. 6 illustrates another computer network which incorporates the present invention.

FIG. 6 illustrates a computer network generally designated 410 according to another embodiment of the present invention. Network 410 comprises a selection server 412 with a data base 413, a content server 417, clients 414-416 and Internet 20 to interconnect the servers and clients. By way of example, the selection server 412 comprises a computer workstation, associated programming and a modem, the content server 417 comprises a computer workstation, associated programming and a modem and each of the clients 414-416 comprises a personal computer, associated programming and a modem. Communications between the clients and the selection server 412 utilize hypertext transport protocol (HTTP) and communications between the clients and the content server 417 utilize file transport protocol (FTP). Although not shown, there are many other servers for the Internet. Selection server 412 is dedicated to automating selection of data updates and additional data, collectively called "new data". The content server 417 includes the actual, new data (stored on disk 421), and data base 413 includes meta data for the new data and FTP addressing information to locate the new data in content server 417. The meta data provides descriptive information about the respective new data such as those user attributes for which the new data is appropriate (assuming the user does not already have the new data). The FTP addressing information indicates the address or identification of the content server which stores the respective new data (content server 417 in the illustrated example), a user ID and password to log-on to the content server, a name of the new data, a list of files which comprise the new data and the size, checksum and directory of each file.

The process for storing the new data in the content server 417 and the meta data in the selection server 412 is not critical to the present invention. However, according to one process, a person writes the new data and meta data and loads them into the content server 417, either via the Internet or by manual loading. The new data remains stored in the content server, but the meta data is written to the selection server 412, either via the Internet or by manual loading.

Figure 7:
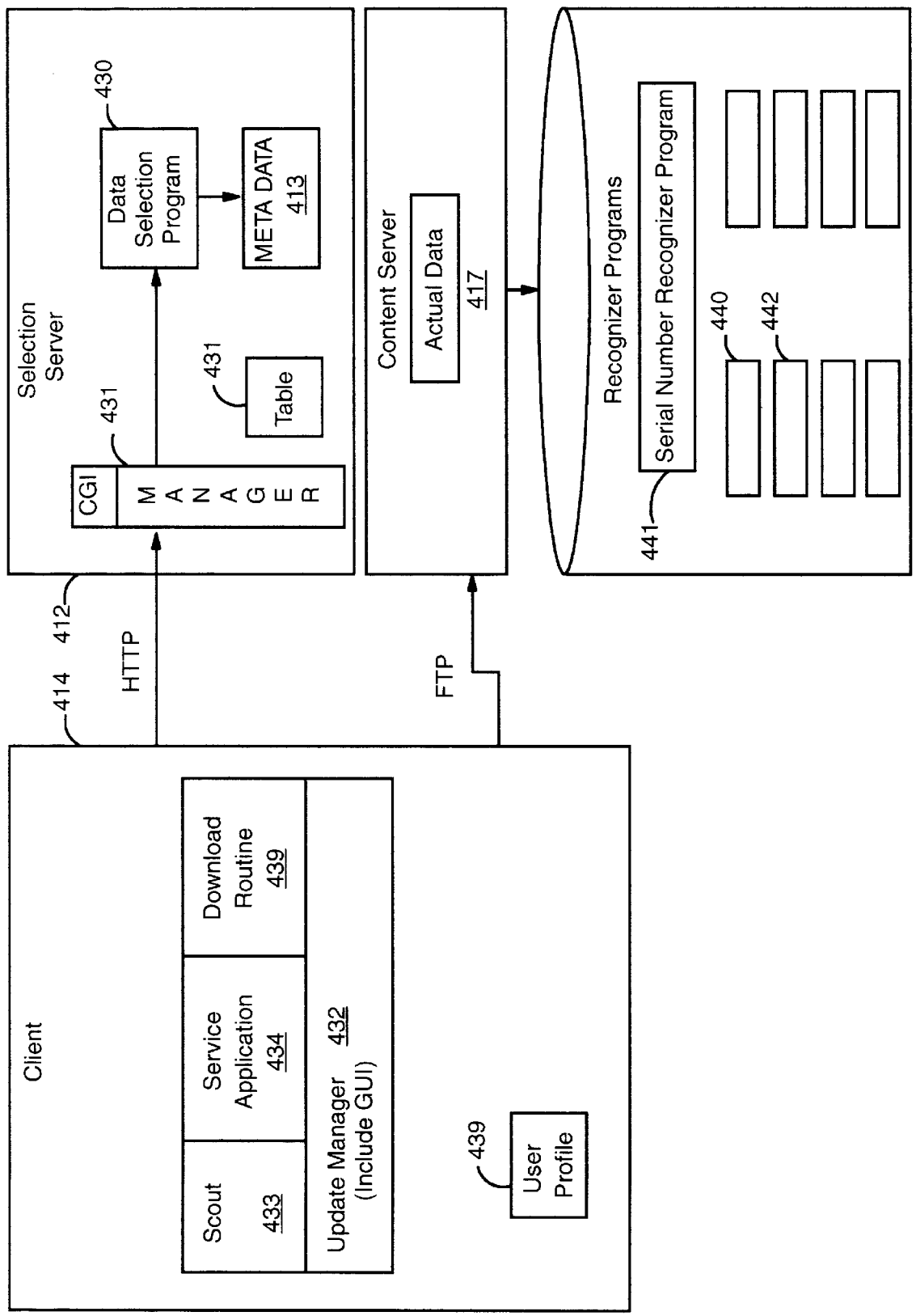
FIG. 7 is a block diagram of a selection server, content server and a client in the network of FIG. 6, which server and client are programmed according to another embodiment of the present invention.
Figure 8A:
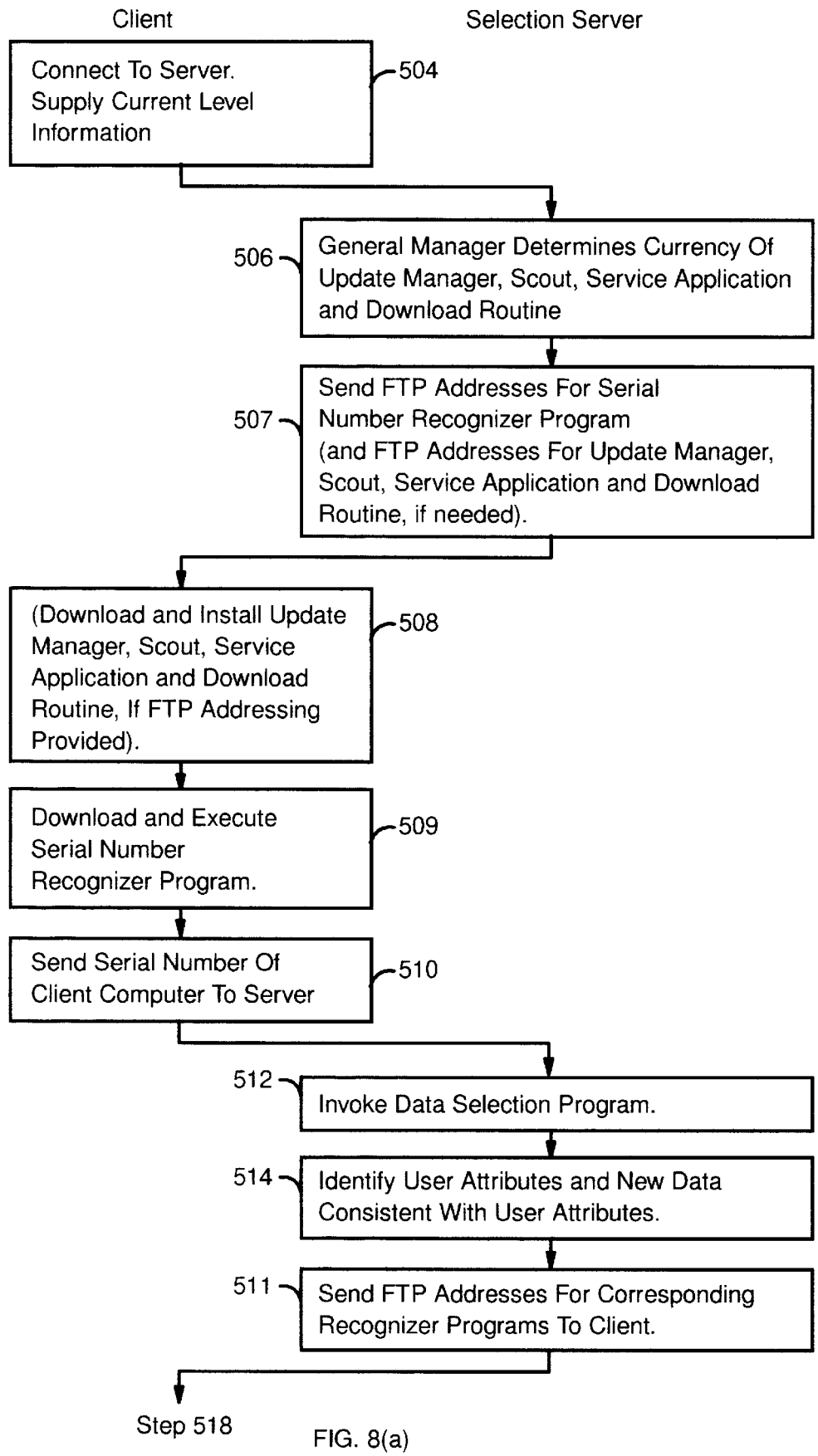
FIGS. 8(a,b) form a flow chart illustrating operation of the client and server of FIG. 7.
Figure 8B:
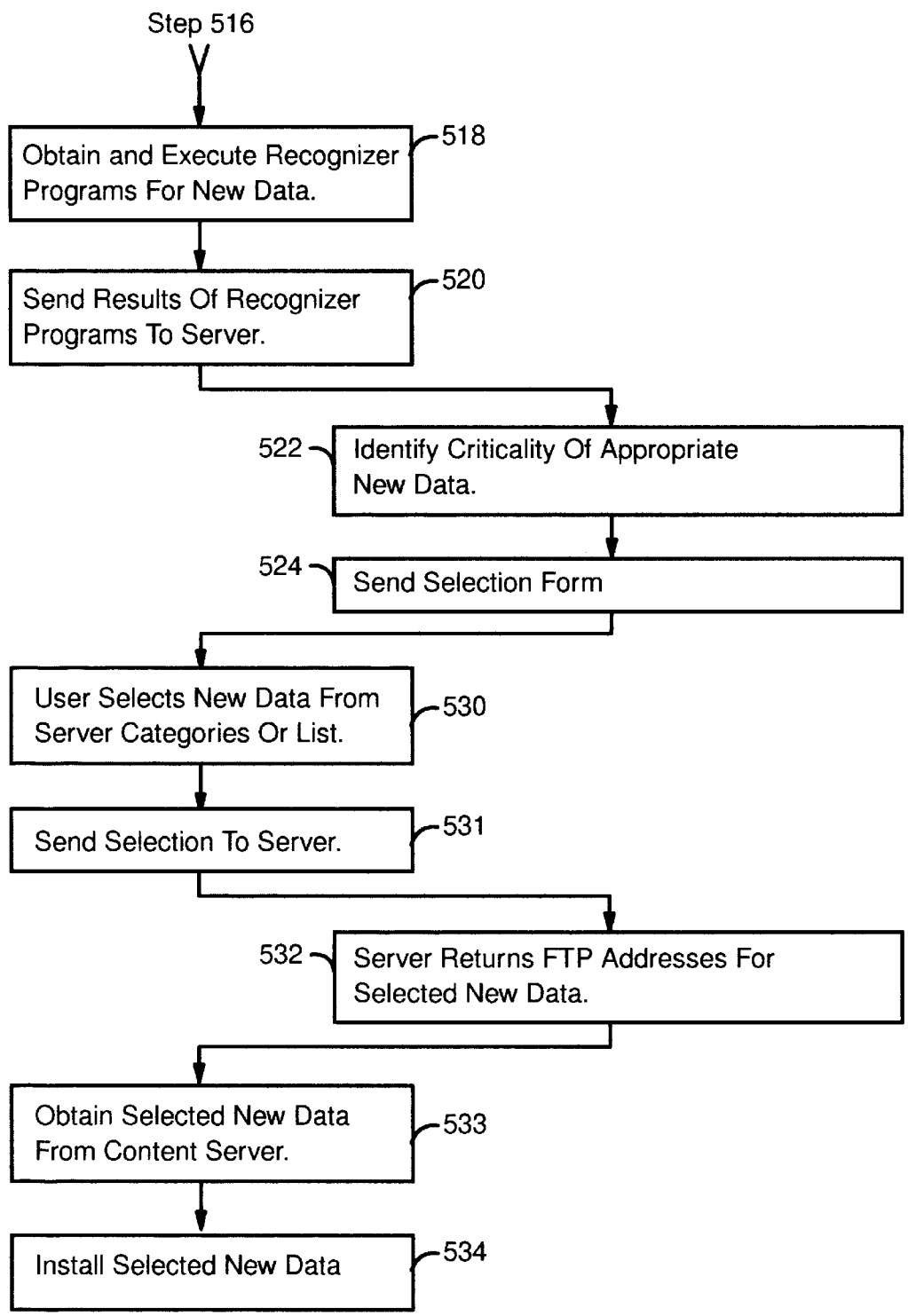

As illustrated in FIG. 7, the selection server 412 is an http server with an associated "CGI" program 431 and includes a data selection program 430. The client 414 includes an update manager program 432 (including a GUI), a scout routine 433, a service application routine 434 and a download routine 439. The functions of the server and client programming and a typical client/server session for selecting and downloading new data are illustrated in FIGS. 8($a,b$). A user at client computer 414 selects an icon to invoke update manager 432. In response, the update manager contacts the general manager 431 in server 412 to begin a session and supplies the current level of update manager 432, scout 433, service application 434 and download routine 439 within client 414 (step 504). In response, the general manager 431 determines if the client's update manager 432, scout 433, service application 434 and download routine 439 are the latest version (step 506). This determination is performed by comparing the client level information supplied by the client 414 to the data in selection server 412 for the latest version of the client's update manager 432, scout 433, service application 434 and download routine 439 stored in the content server 417.

If the client's update manager, scout, service application and download routine are not the latest version, the server sends the FTP addressing information to the client to allow the client to retrieve the latest versions from a content server. Along with the FTP addressing for the client update manager, scout, service application and download routine, the server sends FTP addressing information to the client for a serial number recognizer program 441 stored in content server 417 which will query client computer 414 for the serial number of client computer 414 (step 507). Next, the client downloads and installs the latest version of the client update manager, scout, service application and download routine from the content server if the FTP addressing was provided (step 508).

The furnishing of the FTP addressing information for the recognizer program 441 begins the new data selection process according to the present invention. The client next downloads the recognizer program 441 from the content server and executes it (step 509). The recognizer program 441 then obtains the serial number of the client machine 414 from the basic input output system (BIOS) firmware, using scout APIs (step 509). The update manager routine 432 then sends the serial number of the client machine 414, obtained by the recognizer program 441, to the selection server 412 (step 510).

This initiates the selection update program 430 (step 512). The selection update program 430 within server 412 then determines, from a table 431, the employee number or name of the user that owns client machine 414. Alternately, in another embodiment of the present invention or when there is more than one user of client computer 414, the user sends his or her name or serial number to the server 412 in step 510. (In this scenario, selection server 412 does not send the FTP of recognizer program 441 to client 414 in step 507 and client 414 does not fetch or execute recognizer program 441. There is no need.)

Once selection server 412 knows the employee number or name of the user of client machine 414, either from recognizer program 441 and table 431 or directly from the user, the selection update program can determine which data is appropriate for the user and which data is not appropriate for the user. This eliminates the vast majority of the data stored in content server 417 (and other content servers, if any) from further consideration (step 514). In the illustrated embodiment, this determination is made by the selection update program first reading from table 431 the user attributes corresponding to the user's serial number or name. These user attributes may include the user's job title, department, profession, age, income, or interests previously expressed by the user and forwarded to the server. Then, the selection update program correlates the meta data in data base 413 to the user's attributes. Matches between the meta data and the user's serial number or other attributes indicate that the corresponding new data may be appropriate for client 414. (In practice, the meta data and table 431 can be arranged in a relational data base to facilitate the correlation function). For example, the following table lists data available in content server 417 and the user attributes/meta data that matches each of the new data.

| New Data | User Attributes/Meta Data |
|---|---|
| Customer List | Marketing person |
| Price List | Marketing person |
| Salary Chart | Manager |
| Company Rules | All Employees |
| Golf Ad #1 (news) | Golfer |
| Golf Ad #2 (equipment) | Golfer |
| Bowling Ad #1 | Bowler |
| Bowling Ad #2 | Bowler |

In this example, users who are marketing employees are entitled to receive only "Customer List", "Price List" and "Company Rules" data. Users who are management employees are entitled to receive only "Salary Chart" and "Company Rules" data. Users who are golfers, but not employees, are targeted to receive only "Golf Ad #1" and "Golf Ad #2" data. Users who are bowlers, but not employees, are targetted to receive only "Bowling Ad #1" and "Bowling Ad #2" data.

For each new data which is consistent with the user's attribute(s), the selection update program 430 sends to the client 414 the FTP addressing information of a corresponding recognizer program and the corresponding meta data (step 516). For example, for a user having the attribute of golfer, the selection update program 430 sends the FTP addressing for recognizer programs 440 and 442, respectively for "Golf Ad #1" and "Golf Ad #2". However, the FTP addressing information is not provided to client 414 for the recognizer programs for the other new data which is not consistent with the user's attribute(s). From the FTP addressing information, the client 414 downloads the actual recognizer programs from the content server 417 (step 518).

Each recognizer program is executable and small, typically 2,000–3,000 bytes. Consequently, each recognizer program can be downloaded from content server 417 to the client 414 in seconds (whereas the corresponding new data may be much larger and take minutes or even hours to download).

It should be noted that based on the user attribute(s) alone, the selection update program 430 within server 412 is not sure which of the new data that is consistent with the user's attribute(s) is actually needed by the client; for example, the client may already have some or all of the new data.

Next, the client 414 executes recognizer programs 440 and 442 with assistance from the scout 433 (step 518). The scout 433 assists the recognizer programs by providing subroutines callable by the recognizer programs. For files required by the recognizer programs, these callable subroutines can locate the files, determine the version of the files, determine the length of the file, identify a directory which lists the files, obtain time stamps for the files, obtain data from inside the files and obtain data from a program registry. This further reduces the requisite length of each recognizer program and therefore shortens the download time. When executed, each recognizer program further investigates storage of the client computer 414 to determine if the user already has the new data available from the client computer. Optionally, the recognizer program may investigate a user profile 439 stored in the client computer 414 to determine whether the new data is consistent with other user attributes stored in user profile 439.

Figure 9:
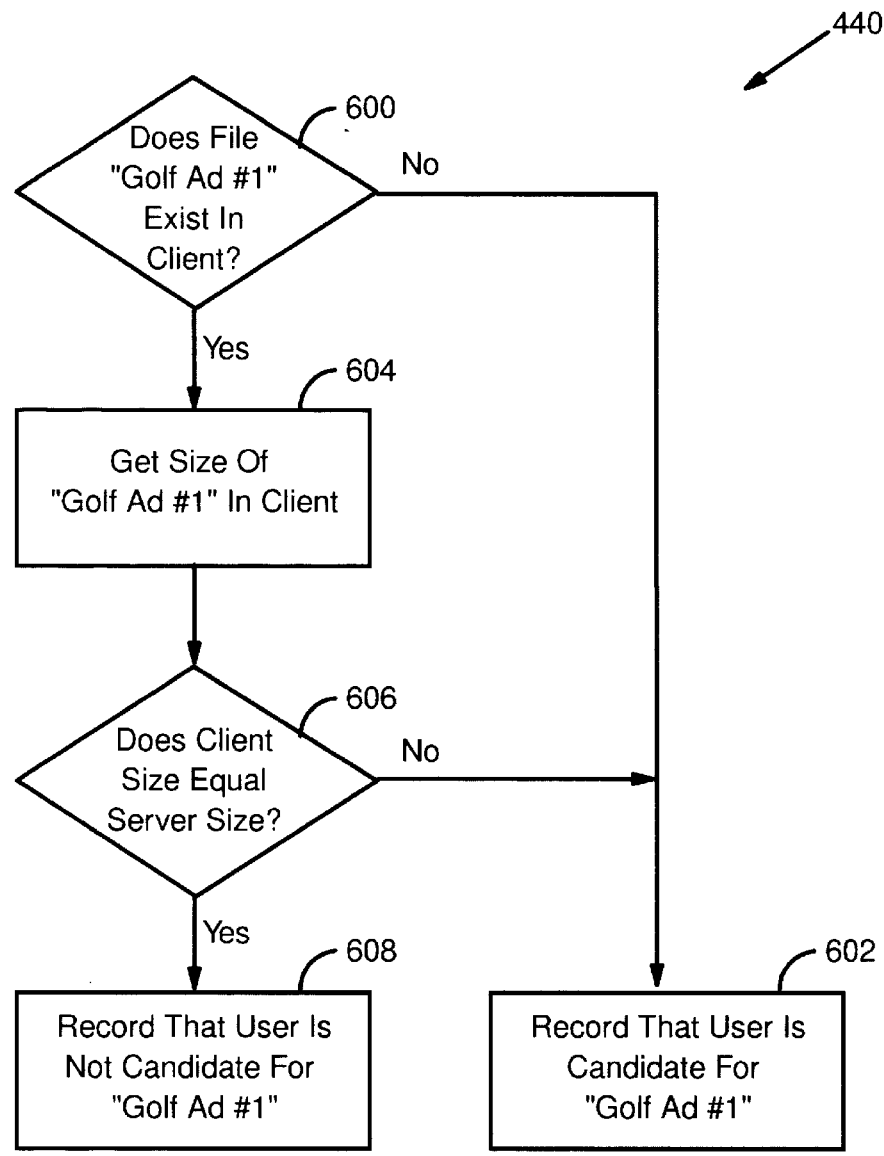
FIG. 9 is a flow chart illustrating a program sent from the server to the client of FIG. 7 to determine needs of the client for a particular set of new data.

Recognizer program 440 is illustrated in more detail in FIG. 9 and investigates the user's storage as follows. In this example, the sole user attribute (stored in table 431 in the selection server 412) is "golfer". First, recognizer program 440 determines from the scout routine 433 in client 414 if client 414 already has a copy of the Golf Ad #1 available for the user (decision 600). If not, then recognizer program 440 determines that, so far, "Golf Ad #1" is deemed appropriate for the user (step 602). However, if client 414 stores a file called "Golf Ad #1", then recognizer program 440 optionally will check if this is the same file as the one currently stored on the server with the same name. Accordingly, recognizer program 440 compares the size of the "Golf Ad #1" file stored in client computer 414 to the size of the "Golf Ad #1" file stored in the content server 417 (step 604 and decision 606). (The size of Golf Ad #1 stored in content server 417 was included in the meta data that was sent along with the FTP address of the recognizer program) If the sizes are different, then recognizer program 440 concludes that they are different files and that this file is deemed appropriate for downloading from the content server to the client computer 414 (step 602). However, if the sizes are the same, then recognizer program 440 concludes that they are the same file, and another copy of "Golf Ad #1" is not appropriate for downloading to the client computer (step 608). Recognizer program 442 performs the same analysis for "Golf Ad #2".

For new data which is lengthy, a respective recognizer program could also determine if the client computer has sufficient memory for the new data by using the appropriate scout function.

A recognizer program could also compare the meta data for new data to user profile 439 maintained in client computer 414 to further determine whether the new data is appropriate for the user. For example, the user profile 439 may qualify that the user's interests in golf are limited to golf news but not golf equipment. In such a case, the recognizer program would determine that "Golf Ad #1" relating to "news" would be appropriate for the user but "Golf Ad #2" relating to "equipment" would not be appropriate for the user.

Figure 10:
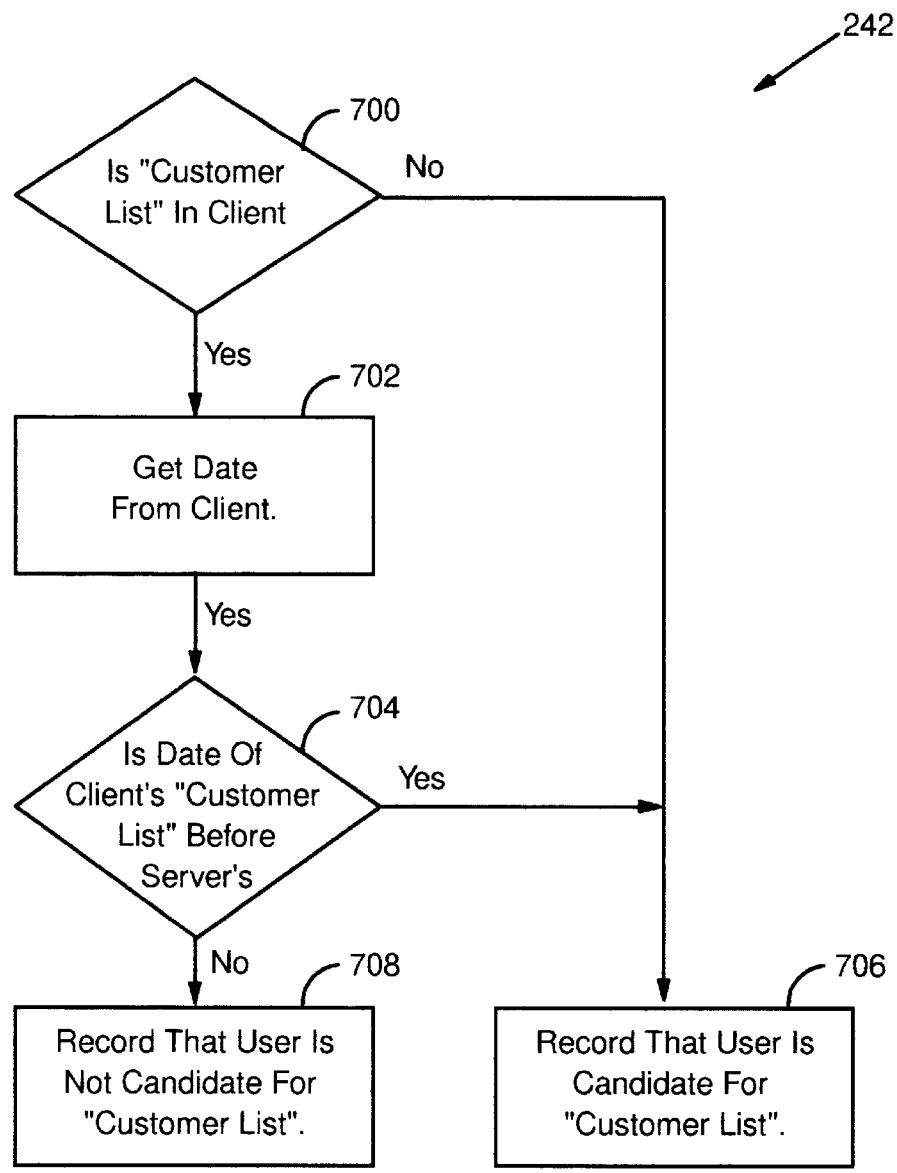
FIG. 10 is another flow chart illustrating a program sent from the server to the client of FIG. 7 to determine needs of the client for another particular set of new data.

Assume that another recognizer program 445 illustrated in FIG. 10 corresponds to the "Customer List" data. Recognizer program 445, when executing in client computer 414, will determine if the user alreay has a file called "Customer List" (decision 700). If not, then the recognizer program 445 determines that this data is appropriate for downloading to the client (step 706). However, if the client already has a file called "Customer List", then recognizer program 445 will compare a date associated with the creation of the "Customer List" file stored in the server (and fetched with recognizer program 445) to the date associated with the creation of the "Customer List" file stored in client 414. If the date stored in the server is later, then the "Customer List" data stored in the server is appropriate for the user (step 706). Otherwise, it is not appropriate for the user (step 708).

The results of the recognizer programs include yes/no answers whether each respective new data is appropriate for the user, i.e. not currently available in client 414 for the user and optionally, consistent with the user's profile, if any, stored in table 439 in the client computer. (The selection update program previously determined that the new data was consistent with the user's attributes stored in table 431 in the server computer). The recognizer programs can also assign a "critical" level to each new data based on the need of the user for the new data. For example, if the data is especially important such as the "Customer List" or the "Salary Chart", and the user has no version or a very old version, then this data would be assigned a high level of criticality. After the recognizer programs are executed in client 414, client 414 sends to selection server 412 a list of the new data which is appropriate for the user (step 520).

Based on the information gathered by the recognizer programs, the selection update program determines the level of criticality of the respective data and builds a selection form for display at the client (step 522). The selection form comprises a list of the new data that is consistent with the user's attributes and appropriate for the client 414, and a display of the following three selection choices (step 524):

1. critical data (to minimize the download time)
2. all new data which is appropriate for the user.
3. client selection of appropriate new data—user selects particular new data from the list of all new data which is appropriate for the user.

Next, the user makes a selection, either selection of the first or second categories or an itemized list of new data pursuant to the third category (step 530), and sends the selection to the server (step 531). In response, the server 412 sends to the client 414 the FTP addressing information for the selected new data (step 532). Using this FTP addressing information, the download routine 439 of the client downloads the new data from the content server 417 (step 533). (In the preferred embodiment of the present invention, the FTP addressing information for all new data represented in the selection form are passed with the selection form to the client 414 in step 524.)

As the new data is being downloaded, the download routine also records status information (such as the FTP addresses) of the new data in case of interruption to the communication line. If there is such an interruption, the downloading can continue later where it left off. Upon completion of the download, the service application routine of client 414 installs the new data in the client 414 for access by the user as follows (step 534). For all files constituting the new data, except those which represent updates to existing data stored in the client computer for which the stale version is currently in use by client 414, the service application routine replaces the existing files in client 414 with the new file. The update manager also lists each data file whose stale version is currently in use. Then, the user is requested to re-boot, and the operating system installs the listed data during the re-boot. For all, appropriate new data selected by the user which represents one or more bytes of a file, the service application routine replaces just the one or more bytes of the file. For such files which are not currently in use, this occurs without requesting the user to re-boot. For such files which are currently in use, the user is requested to re-boot, and the operating system installs the one or more bytes during the re-boot.

Based on the foregoing, techniques for selecting and transferring code updates and new data to a client computer have been disclosed. However, numerous modifications and substitutions can be made without deviating from the scope of the present invention. For example, there can be multiple content servers, or the selection server functions and content server function can be merged into one server. If desired, protocols other than HTTP and FTP can be used. Therefore, the present invention has been disclosed by way of illustration and not limitation and reference should be made to the following claims to determine the scope of the present invention.

We claim:

1. A server computer for selecting code updates to download to a client computer, said server computer comprising:

means for identifying code updates which are consistent with basic system characteristics of the client computer;

means for sending to said client computer one or more programs which execute in said client computer to determine whether said client computer has a version other than a current version of the identified code updates; and means for receiving results of said programs, determining which of the code updates that are consistent with said basic system characteristics represent current versions of code within said client computer and are not currently resident in said client computer; and wherein at least one of said recognizer programs is less than three thousand bytes in length.

2. A server computer as set forth in claim 1 further comprising:

means for transmitting to said client computer a list of or information about said determined code updates; and means for receiving selection from said client computer of one or more of the determined code updates.

3. A server computer as set forth in claim 2 further comprising means for sending address information for the selected code updates to said client computer so that said client computer can obtain said selected code updates from another server computer.

4. A server computer as set forth in claim 1 wherein the identifying means comprises:

program means, executable in said client computer, for obtaining said basic system characteristics of said client computer;

means for sending to said client an address of said program means; and means for receiving said basic system characteristics from said client.

5. A server computer as set forth in claim 2 wherein said information about said list comprises a category designating all updates which are consistent with but not currently resident in said client, and another category designating only critical updates.

6. A server computer for selecting data to download to a client computer for access by a user, said server computer comprising:

means for identifying data which is consistent with attributes of said user;

means for sending to said client computer one or more programs or addresses of said one or more programs which execute in said client computer to determine whether said client computer already has said data; and means for receiving results of said programs, and determining which of the data that is consistent with said user attributes is not currently resident in said client computer.

7. A server computer as set forth in claim 6 further comprising:

means for transmitting to said client computer a list of or information about said data that is consistent with said user attributes and is not currently resident in said client computer; and means for receiving selection from said user of one or more of said data that is consistent with said user attributes and is not currently resident in said client computer.

8. A server computer as set forth in claim 7 further comprising means for sending address information for the selected data to said client computer so that said client computer can obtain said selected data from another server computer.

9. A server computer as set forth in claim 6 wherein the identifying means comprises:

program means, executable in said client computer, for obtaining a serial number or other identification of said client computer;

means for sending to said client computer an address of said program means; and means for receiving said serial number of other identification of said client computer from said client computer resulting from execution of said program means, and correlating said serial number or other identification to stored user attributes accessible by said server computer.

10. A server computer as set forth in claim 6 wherein the identifying means comprises:

means for receiving an identification of said user, and correlating said identification of said user to stored attributes of said user accessible by said server computer.

11. A server computer as set forth in claim 7 wherein said information about said data comprises a category designating all data which is consistent with but not currently resident in said client computer, and another category designating only critical data.

12. A server computer as set forth in claim 6 wherein the program sending means sends a separate program for each set of data and each of said programs determines if the client computer has the respective set of data.

13. A method performed by a server computer for selecting data to download to a client computer for access by a user of said client computer, said method comprising the steps of:

identifying data which is consistent with attributes of said user;

sending to said client computer one or more programs or addresses of said one or more programs which execute in said client computer to determine whether said client computer already has said data; and receiving results of said programs, and determining which of the data that is consistent with said user attributes is not currently resident in said client computer.

14. A method as set forth in claim 13 further comprising the following steps performed by said server computer:

transmitting to said client computer a list of or information about said data that is consistent with said user attributes and is not currently resident in said client computer; and receiving selection from said user of one or more of said data that is consistent with said user attributes and is not currently resident in said client computer.

15. A method as set forth in claim 14 further comprising the step of sending address information for the selected data from the server computer to said client computer so that said client computer can obtain said selected data from another server computer.

16. A method as set forth in claim 13 wherein the identifying step comprises the steps of:

sending a program or an address of said program to said client for execution in said client computer, said program obtaining a serial number or other identification of said client computer; and receiving said serial number of other identification of said client computer from said client computer resulting from execution of said program, and correlating said serial number or other identification to stored user attributes accessible by said server computer.

17. A method as set forth in claim 13 wherein the identifying step comprises the steps of:

receiving an identification of said user, and correlating said identification of said user to stored attributes of said user accessible by said server computer.

18. A method as set forth in claim 13 wherein said information about said data comprises a category designating all data which is consistent with but not currently resident in said client computer, and another category designating only critical data.

19. A method as set forth in claim 13 wherein the server sends a separate program for each set of data and each of said programs determines if the client computer has the respective set of data.

20. A computer program product executed in a server computer for selecting data to download to a client computer for access by a user of said client computer, said computer program product comprising:

a computer readable medium;

first program instruction means for instructing a processor to identify data which is consistent with attributes of said user;

second program instruction means for instructing a processor to send to said client computer one or more programs or addresses or said one or more programs which execute in said client computer to determine whether said client computer already has said data; and third program instruction means for instructing a processor to receive results of said programs, and determine which of the data that is consistent with said user attributes is not currently resident in said client computer; and wherein all of said program instruction means are recorded on said medium.

* * * * *